(12) United States Patent
Andersen et al.

(10) Patent No.: US 8,742,630 B2
(45) Date of Patent: Jun. 3, 2014

(54) ONE WIRE SELF REFERENCING CIRCUITS FOR PROVIDING POWER AND DATA

(75) Inventors: James N. Andersen, Elgin, IL (US); Eduardo Cantoral, Warrenville, IL (US); Michael Miskin, Sleepy Hollow, IL (US)

(73) Assignee: Lynk Labs, Inc., Elgin, IL (US)

( * ) Notice: Subject to any disclaimer, the term of this patent is extended or adjusted under 35 U.S.C. 154(b) by 0 days.

(21) Appl. No.: 10/505,909

(22) PCT Filed: Feb. 28, 2003

(86) PCT No.: PCT/US03/06194
§ 371 (c)(1),
(2), (4) Date: Apr. 19, 2005

(87) PCT Pub. No.: WO03/075126
PCT Pub. Date: Sep. 12, 2003

(65) Prior Publication Data
US 2005/0173990 A1    Aug. 11, 2005

Related U.S. Application Data

(60) Provisional application No. 60/360,486, filed on Feb. 28, 2002, provisional application No. 60/372,546, filed on Apr. 15, 2002, provisional application No. 60/403,580, filed on Aug. 14, 2002, provisional application No. 60/406,703, filed on Aug. 29, 2002, provisional application No. 60/409,482, filed on Sep. 10, 2002, provisional application No. 60/411,243, filed on Sep. 17, 2002, provisional application No. 60/415,930, filed on Oct. 3, 2002, provisional application No. 60/418,641, filed on Oct. 14, 2002, provisional application No. 60/418,940, filed on Oct. 16, 2002, provisional application No. 60/424,266, filed on Nov. 6, 2002.

(51) Int. Cl.
*H05K 7/14* (2006.01)

(52) U.S. Cl.
USPC ............................................. 307/149

(58) Field of Classification Search
USPC ................................. 307/149, 104
See application file for complete search history.

(56) References Cited

U.S. PATENT DOCUMENTS

| | | |
|---|---|---|
| 3,934,399 A | 1/1976 | Nishimura et al. |
| 4,146,831 A | 3/1979 | Farr |
| 4,220,909 A | 9/1980 | Piteo |
| 4,253,054 A | 2/1981 | Steigerwald |
| 4,314,194 A | 2/1982 | Severing |

(Continued)

FOREIGN PATENT DOCUMENTS

| | | | |
|---|---|---|---|
| EP | 1263114 A2 | 12/2002 | |
| GB | 2292866 A | * 3/1996 | |

OTHER PUBLICATIONS

Naudin, Jean-Louis, Avramenko's Free Electrons Pump, Nov. 1, 1999 http://jnaudin.free.fr/html/afep01.htm.*

(Continued)

*Primary Examiner* — Daniel Cavallari
(74) *Attorney, Agent, or Firm* — Factor Intellectual Property Law Group, Ltd.

(57) ABSTRACT

A one wire self referencing circuit provides power or data at relatively low power and relatively high frequency.

3 Claims, 11 Drawing Sheets

(56) References Cited

U.S. PATENT DOCUMENTS

| | | | |
|---|---|---|---|
| 4,382,222 | A | 5/1983 | Kurz et al. |
| 4,395,673 | A | 7/1983 | Kurz |
| 4,399,396 | A | 8/1983 | Hase |
| 4,602,310 | A * | 7/1986 | Fenster .......................... 361/212 |
| 5,078,627 | A | 1/1992 | Anderson |
| 5,424,594 | A | 6/1995 | Saito et al. |
| 5,430,364 | A | 7/1995 | Gibson |
| 5,731,691 | A | 3/1998 | Noto |
| 6,104,107 | A | 8/2000 | Avramenko et al. |
| 6,208,118 | B1 | 3/2001 | Li |
| 6,215,271 | B1 | 4/2001 | Lerow et al. |
| 6,239,582 | B1 | 5/2001 | Buzan et al. |
| 6,353,307 | B1 | 3/2002 | Koelle et al. |
| 6,778,070 | B1 * | 8/2004 | Thomas ....................... 340/10.1 |
| 2002/0017991 | A1 * | 2/2002 | Wuidart et al. ............. 340/572.1 |
| 2002/0075614 | A1 * | 6/2002 | Li ................................... 361/56 |
| 2002/0140433 | A1 * | 10/2002 | Lawson et al. ................ 324/509 |

OTHER PUBLICATIONS

Kingston, Switching Time in Junction Diodes and Junction Transistors, May 1954,Proceedings of the IRE, vol. 42, issue 5, pp. 829-834.*

"The Bridge Rectifier," from http://www.tpub.com/neets/book6/22chtm; May 30, 2002; 4 pages.

"The Conventional Full-Wave Rectifier," from http://www.tpub.com/neets/book6/22chtm; May 30, 2002; 5 pages.

Frolov, Alexander V., The Single-Wire Electric Power Transmission,, published in *New Energy News*, Dec. 1994, pp. 13-15.

Naudin, Jean-Louis, Single-Wire Energy Transmission Test, from http://jnaudin.free.fr/html/afep012.htm, Jun. 3, 2002, 7 pages.

Frolov, Alexander V., "Application of Ether Longitudinal Waves for Telecommunication Systems," from http://alexfrolov.narod.ru/longfortelecom.htm, May 26, 2002, 3 pages.

* cited by examiner

ONE WIRE SELF REFERENCING CIRCUITS FOR PROVIDING POWER AND DATA

CROSS REFERENCE TO RELATED APPLICATIONS

This Application is a U.S. National filing under §371 of International Application No. PCT/US03/06194, with an international filing date of 28 Feb. 2003, now pending, claiming priority from the following pending U.S. Provisional Applications Nos. 60/360,486 filed 28 Feb. 2002; 60/372,546 filed 15 Apr. 2002; 60/403,580 filed 14 Aug. 2002; 60/406,703 filed 29 Aug. 2002; 60/409,482 filed 10 Sep. 2002; 60/411,243 filed 17 Sep. 2002; 60/415,930 filed 3 Oct. 2002; 60/418,641 filed 14 Oct. 2002; 60/418,940 filed 15 Oct. 2002; and 60/424,266 filed 6 Nov. 2002, and herein incorporated by reference.

TECHNICAL FIELD

The present application relates generally to the field of electronics and more particularly to circuits and methods for providing power or data transmission at relatively low power and relatively high frequency.

BACKGROUND AND SUMMARY OF THE INVENTION

This invention continues the line of inventions of Nikola Tesla, and Stanislav and Konstantin Avramenko. It is possible to transfer power through one wire, even to operate an electric motor. For the field of electric light, it is also possible to transfer power without any wires.

The self reference one wire method and device goes one step ahead. For low power light applications and for signal applications there are benefits in using the single wire as a reference voltage without the need to bring extra objects to dissipate the energy already in place. With precautions to protect integrated circuits and low power electronic devices, it is possible to design efficient systems when the energy and the error budgets are important. Hand held devices and other portable electronic systems without tethers are more and more in use. By reducing the number of connections inside these systems, more efficient designs are possible. It is even conceivable to design portable systems without batteries.

One wire electric transmission is due to displacement currents. The dipoles in matter and in the electromagnetic vacuum can move back and forth in the presence of a longitudinal alternating electric field. A positive charge moving in the direction of the electric field contributes equally to the current as a negative charge moving in the opposite direction. There does not have to be a net displacement of charge, from left to right say, to have an electric current. There is no need for a return path.

There is no fundamental need to return all charges to a common dump either. One has to be careful not to produce intense electric fields that break the stability of the material circuits, but beyond that, there is no need to return all charges to a big reservoir like the earth. For portable devices this is a good thing, otherwise they would be impossible to construct. To perform all the tasks required, it is enough to have either real dipoles in material substances, or virtual dipoles in the electromagnetic vacuum. Once the function has been satisfied, the device goes back to the state it had when the process started.

The five main components of this invention are:
1. Circulation/symmetry breaking/dipoles
2. Difference of time constant between charge and discharge
3. DC offset
4. Frequency/voltage dependence
5. Open system/harnessing external electromagnetic energy

DETAILED DESCRIPTION OF PREFERRED EMBODIMENTS

Figure 1:
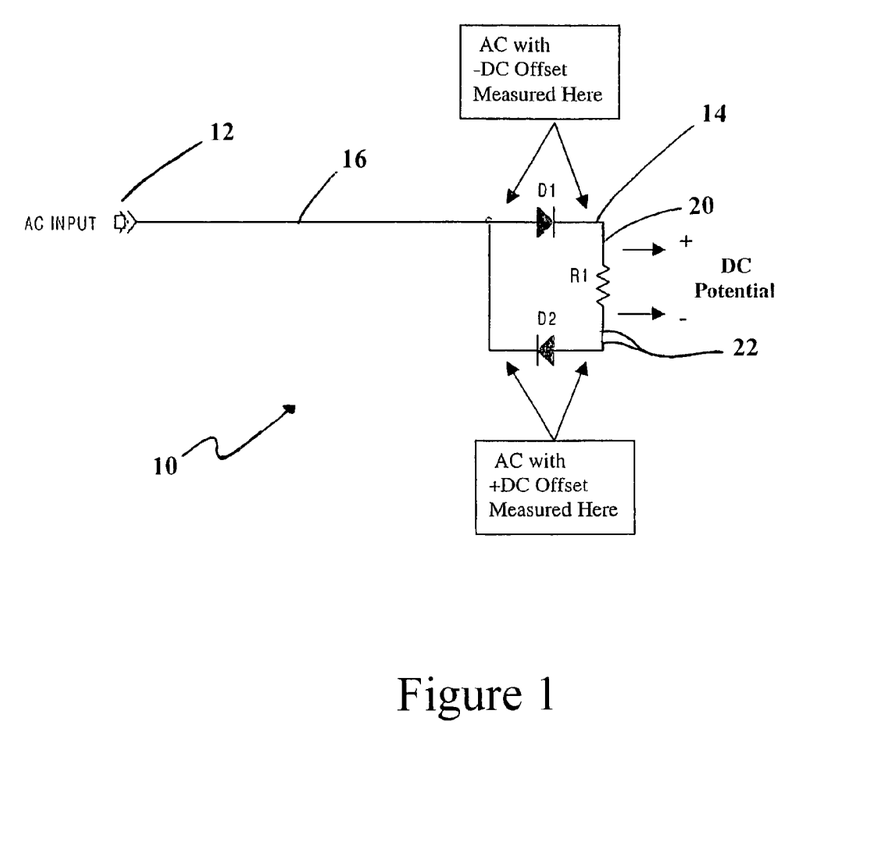
FIG. 1 shows a schematic view of a preferred embodiment of the invention.

FIG. 1 discloses a preferred circuit 10 according to the invention. The circuit 10 includes a first source for providing an alternating electrical field. The source may be the output of a standard AC signal generator such as generator 12 of FIG. 1. This generator 12 may produce its signal with reference to ground as indicated in FIG. 1. Circuit 10 also discloses a directional circuit 14 connected to the generator 12 by a transmission conductor 16. According to the invention the conductor 16 may be any form of conventional conductive path whether twisted wire bundles, single wires, etc. The point is that the transmission conductor 16 provides a single transmission path to the directional circuit 14. Important to the invention is the fact that there is no conductive return path provided back from the directional circuit 14 to the generator.

In the broad sense, the directional circuit 14 is a loop circuit which includes one or more circuit elements causing the loop circuit to be asymmetric to current flow. Again it is important that the directional circuit 14 has no continuous conductive path to earth ground, or a battery ground. As such, and as disclosed in FIG. 1 the directional circuit 14 develops a DC potential across a load, such as resistor R1 in response to the alternating electric field. This DC potential is not referenced to ground but merely to the potential differences created by the circulation of current (see FIG. 2) in the loop across the load (resistor R1 of FIG. 1). Accordingly, the DC potential is self referencing. As far as the resistor R1 is concerned, circuit 10 presents it with a relatively higher DC potential output at 20 and a relatively lower potential output at 22.

Figure 2:
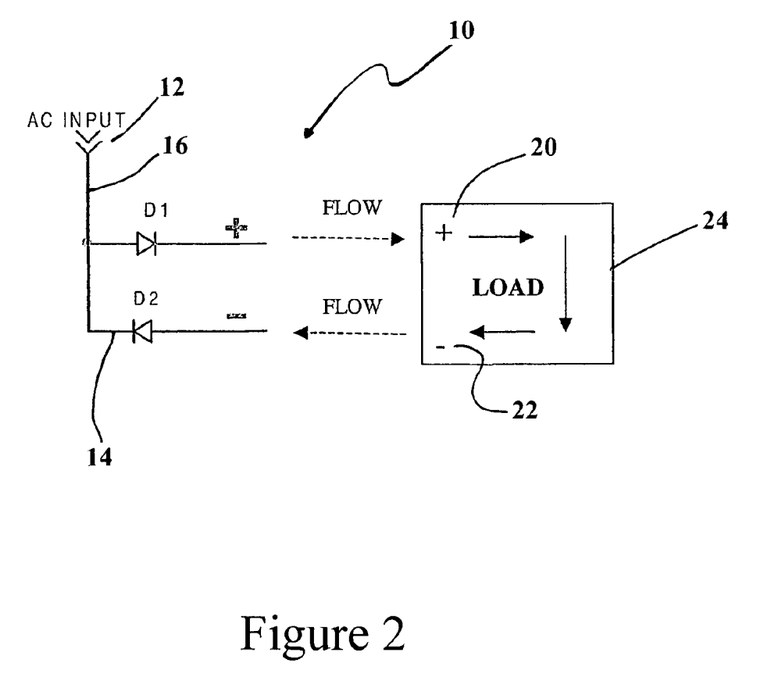
FIG. 2 shows a schematic view of a preferred embodiment of the invention.

FIG. 2 discloses circuit 10 with the load represented as a generic load 24 (rather than resistor R1) to show the circulation path of current flow (indicated by the arrows) in any generic load circuit utilizing the DC potential of circuit 10.

FIGS. 1 and 2 disclose that the loads connected to the directional circuit 14 do not have a continuous conductive path to earth ground or a battery ground. They also disclose that the directional circuit 14 has circuit elements causing the directional circuit to be asymmetric to current flow. In the preferred embodiment disclosed, these circuit elements are diodes D1 and D2. However, it is contemplated that numerous other circuit elements could provide the same functionality, in particular, semiconductors with "pn" junctions; electrets, plasma; or combinations of thereof.

Figure 3:
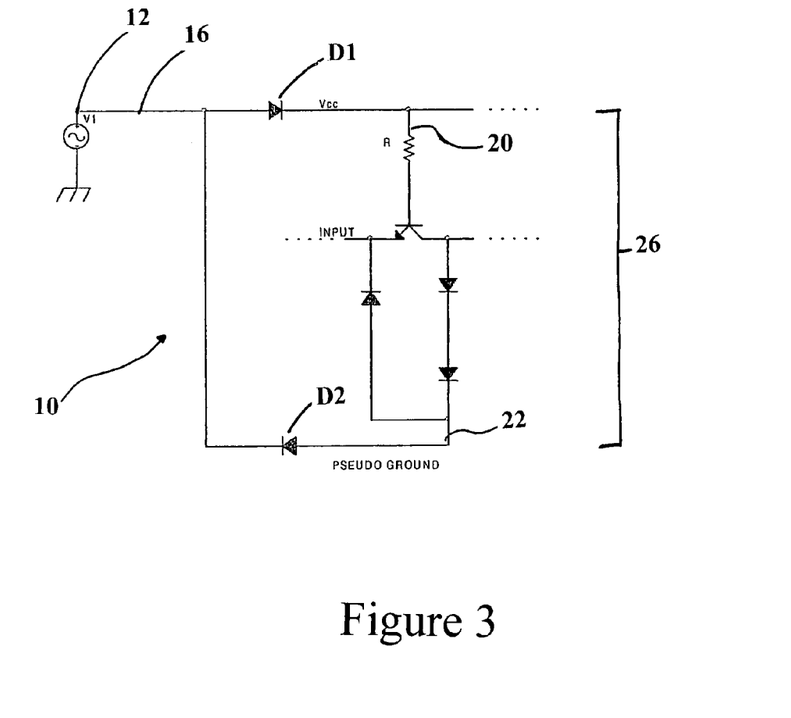
FIG. 3 shows a schematic view of a preferred embodiment of the invention.

The circuit 10 is preferably used for telecommunications where the transmission line may be up to 100 to 100,000 feet. The circuit 10 is also preferably useful in Transistor-Transistor Logic ("TTL") applications as disclosed in FIG. 3 showing a standard TTL output circuit 26 powered by circuit 10. In that application, the DC voltages necessary range from 0V to +/−5V.

FIGS. 1-3 each disclose that directional circuit 14 includes first and second diodes D1, D2 with D1 having an anode and diode D2 having a cathode which are commonly connected to the transmission conductor 16. The cathode of the first diode D1 is connected to the relatively more positive side of the load 20 while the anode of the second diode is connected to the relatively less positive side 22 of the loads to form the loop circuit among the diodes and the load.

Figure 4:
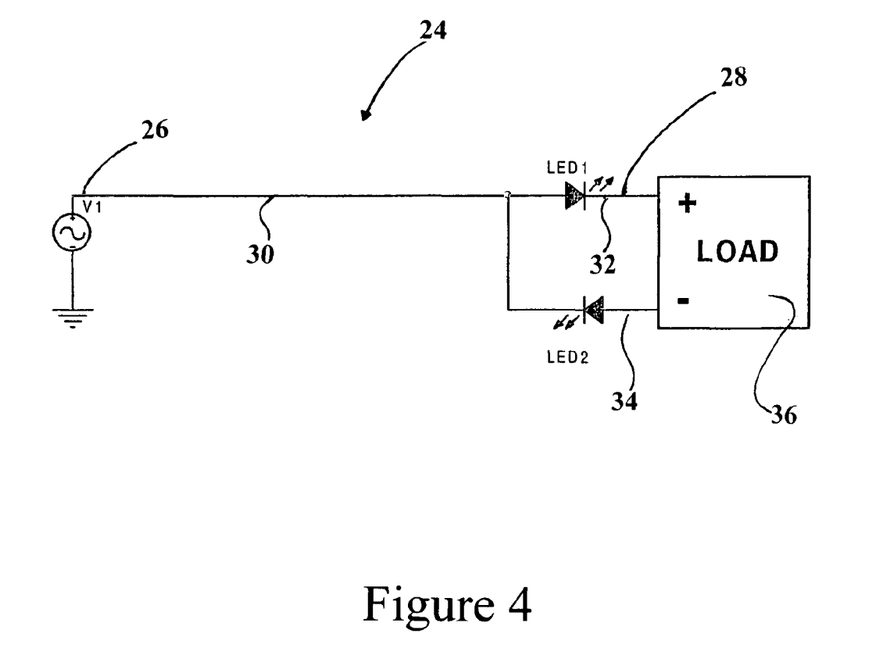
FIG. 4 shows a schematic view of a preferred embodiment of the invention.

FIG. 4 discloses a circuit 24 according to the invention having a generator 26 and a directional circuit 28 includes first and second light emitting diodes (LEDs), the first LED 1 has an anode and the second LED 2 has a cathode which are commonly connected to the conductor 30 from the generator 26. The cathode of LED 1 is connected to the relatively more positive voltage side 32 of the load 36 while the anode of LED2 is connected to the relatively less positive side 34 of the load 36 to form the loop circuit 28 among the LEDs 1 and 2. In this embodiment the load is configured to optimize the lumens produced by the LEDs. For example the LEDs 1,2.

Figure 5:
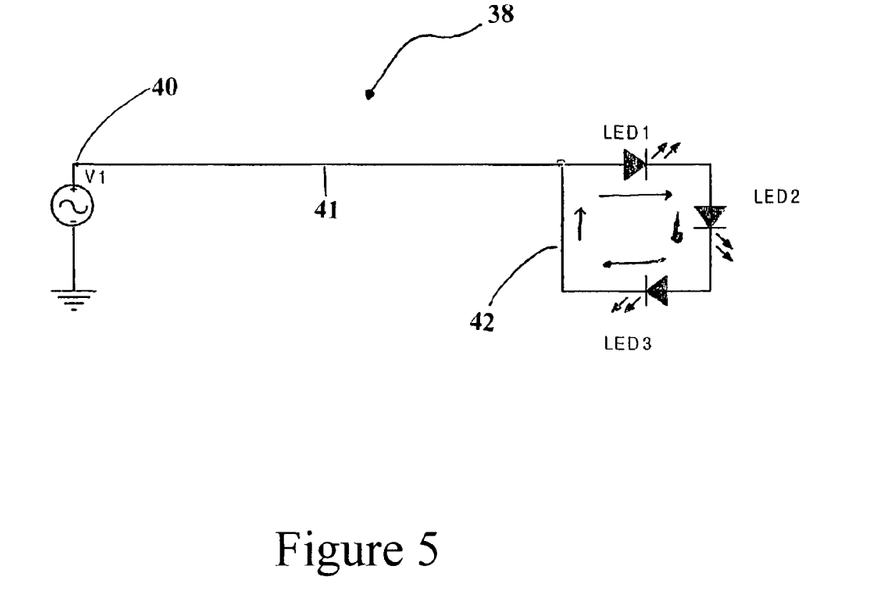
FIG. 5 shows a schematic view of a preferred embodiment of the invention.
Figure 6:
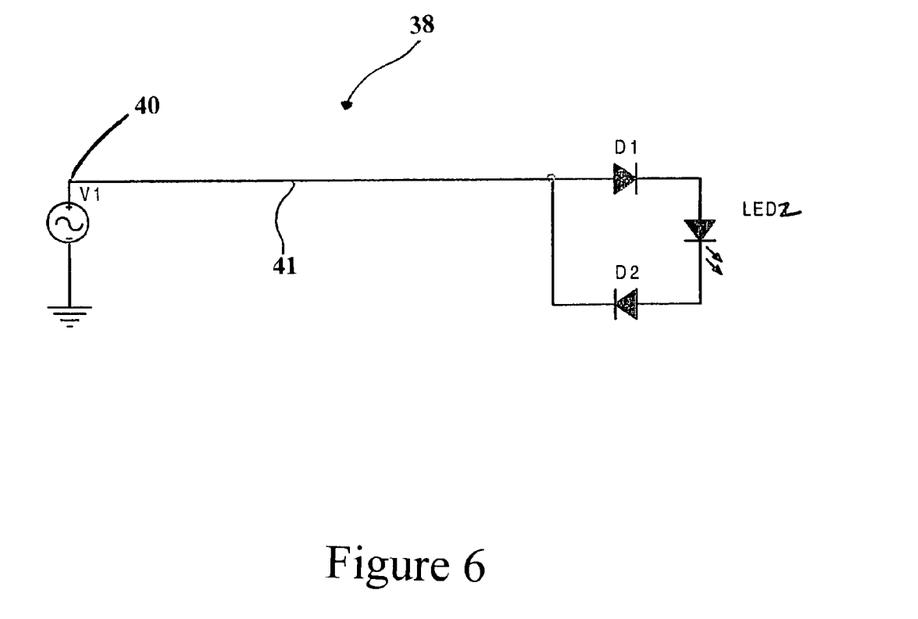
FIG. 6 shows a schematic view of a preferred embodiment of the invention.

FIG. 5 discloses a circuit 38 according to the invention. In this embodiment, a generator 40 produces an alternating electric field on transmission conductor 40. The conductor 41 is connected to a directional circuit 42 having circuit elements causing an asymmetrical response to the alternating field and current flow. In particular, circuit 42 includes three LEDs 1,2,3 configured to provide circulation according to the direction of the arrows (see FIG. 5). In this embodiment, all three LEDs, 1-3 provide light as an output that can be considered a load. This shows that relative nature of the positioning of elements in the various directional circuits disclosed herein according to the invention. If light is desired, then each of the diodes may be considered both loads and circuit elements which cause asymmetrical current flow. For example, FIG. 6 discloses the same circuit 38 with only the substitution of LEDs 1 and 3 by diodes D1 and D2. In this circuit, optimization of the light emitted by LED 2 is of paramount concern, whereas the diodes 1,2 provide directionality and a DC offset to the AC generator signal as will be disclosed in more detail below.

Figure 7:
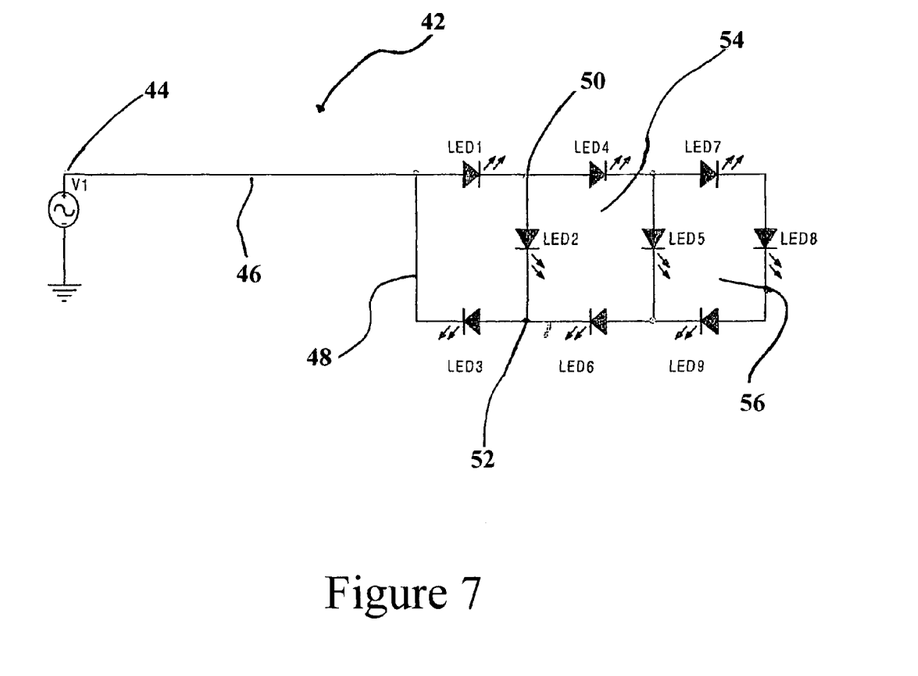
FIG. 7 shows a schematic view of a preferred embodiment of the invention.

FIG. 7 discloses a circuit 42 having an AC generator 44 inducing an alternating electric field onto transmission conductor 46 which is connected to a first directional circuit 48 having LEDs 1-3. LED 2 acting as a load to circuit 48, provides the relatively high DC potential at point 50 and a relatively lower DC potential at point 52 to another directional circuit 54 comprised of LEDs 4-6. This is repeated for another directional circuit 56 and LEDs 7-9. Again, the circuit components LEDs 1-9 provide both directionality and useful work as a load in the form of producing light. According to another aspect of the invention, the circuit 42 discloses the multiplexing possibilities of the directional circuits 48, 52, 56.

Figure 8:
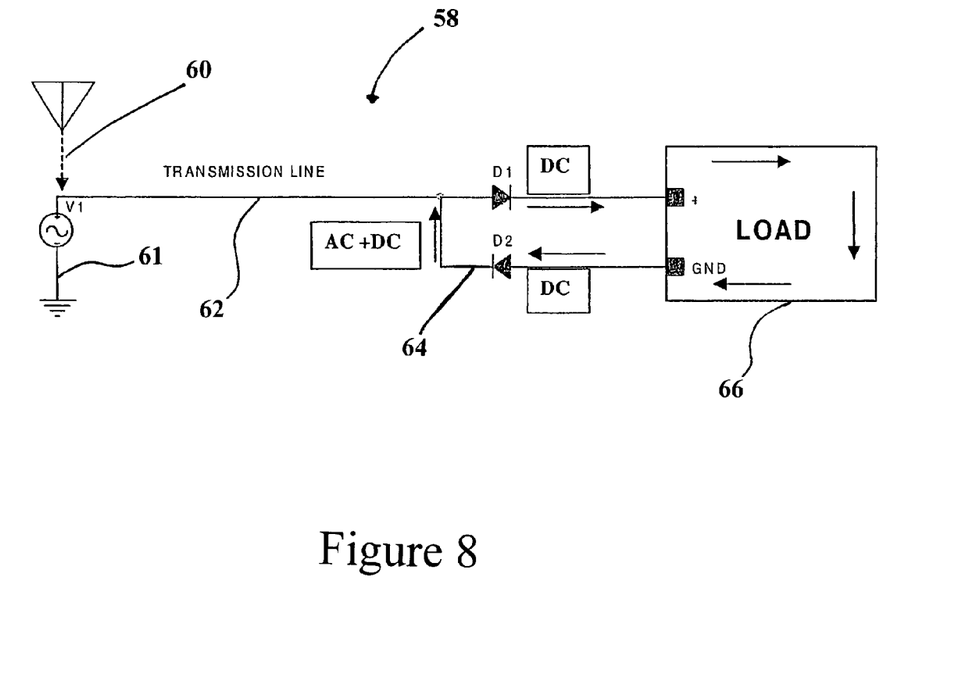
FIG. 8 shows a schematic view of a preferred embodiment of the invention.

FIG. 8 discloses a circuit 58 to illustrate another aspect of the invention, in particular the transmission of information or data as one may use the terms. Accordingly, the alternating electric field is provided (as it could be with any embodiment disclosed herein) by either an antennae 60 or a signal generator 61. The alternating signal source is imposed on transmission conductor 62. A directional circuit 64 is comprised of a load 66 and two diodes D1 And D2. The circuit 58 discloses the directional DC current flow as well as an AC plus DC current flow and potential indicated by "AC+DC" in FIG. 8. This DC plus AC component is important to the transmission of information or data signals from the generators 60, 61.

Figure 9:
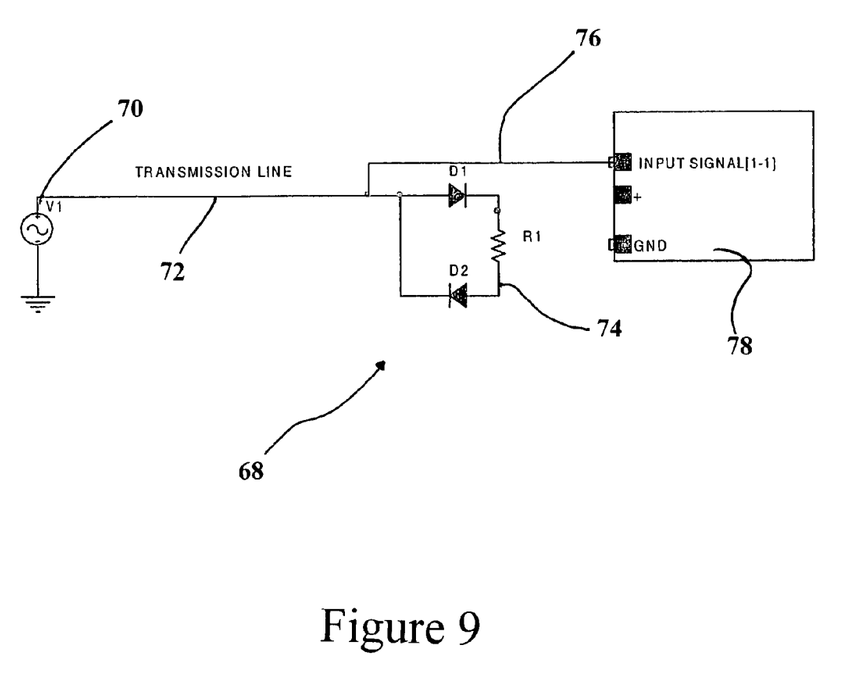
FIG. 9 shows a schematic view of a preferred embodiment of the invention.

In particular, FIG. 9 discloses a circuit 68 having a signal generator 70 a transmission conductor 72, and a directional circuit 74. The directional circuit has asymmetrical-diode elements D1 and D2 and a load R1. In this and the other embodiment disclosed herein (see FIG. 8), the directional circuit 74 is constructed to permit a DC voltage level to accrue on the transmission conductor 72 along with the AC signal to provide an offset to the signal. This offset is preferential to the signal as the signal is ungrounded. It is believed that this may prevent noise in the system to be added to the line 72 as a second alternating field but with reference to ground. Accordingly the noise adds to the DC level but not to the signal level in the same proportions.

Also as disclosed in FIG. 9, an out put 76 is provided which will transmit the AC signals from transmission line 72 to an information or data signal receiver 78 which will detect the signal riding the DC level. The DC level can easily be distinguished and handled by such a receiver as is conventional. It should be understood that the signal receiver 78 may be of any conventional type of Ttl logic device, modem, or telecommunications receiver and is believed to operate best with the preferred systems of the invention when it is not connected to earth ground or a battery ground, or a current sink or charge collector (as i the case for the working loads disclosed through out this disclosure).

Figure 10:
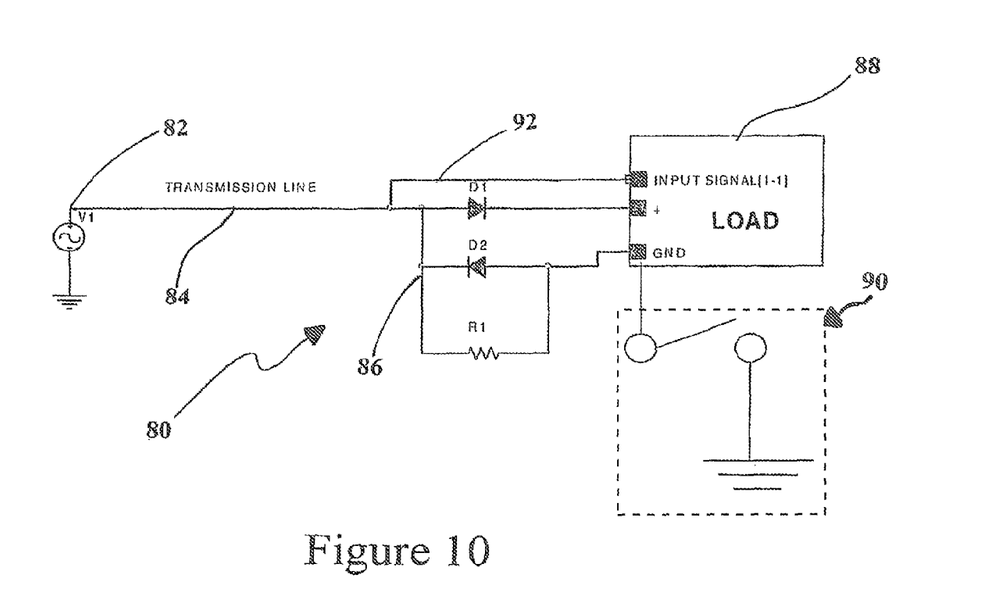
FIG. 10 shows a schematic view of a preferred embodiment of the invention.

According to another embodiment, FIG. 10 discloses another information or data communication circuit 80. The circuit 80 includes a signal generator 82, a transmission conductor 84, a directional circuit 86, a data receiver 88, and a ground switch 90. In this embodiment, the directional circuit 86 provides both the DC power for the receiver 88, and a data signal through output 92 connected between the receiver input and the common connection between the conductor 84 and directional circuit input to anode of diode D1 and cathode D2. In the meantime, the receiver is powered on the DC potential difference between output of D1 and the input to D2. In this embodiment, resistor R1 is provided according to another aspect of the invention to regulate or select as desired the level of DC offset the AC data signal will have at line 92.

According to another aspect of the invention, the ground switch 90 is provided to provide a non-continuous connection to a circuit, such as the ground circuit disclosed in FIG. 10, to dissipate excessive accumulations of charge or viltage potentials in the circuit 80. It is contemplated that the switch 90 be actuated based upon a timing (such as a pre-selected clock pulse) criteria, or by a sensor (not shown) of an undesirable DC level developing in the circuit 80. Once engaged, the circuit 90 would dissipate the excess energy to a ground, ground, plane, capacitor, battery ground, or the like.

Figure 11:
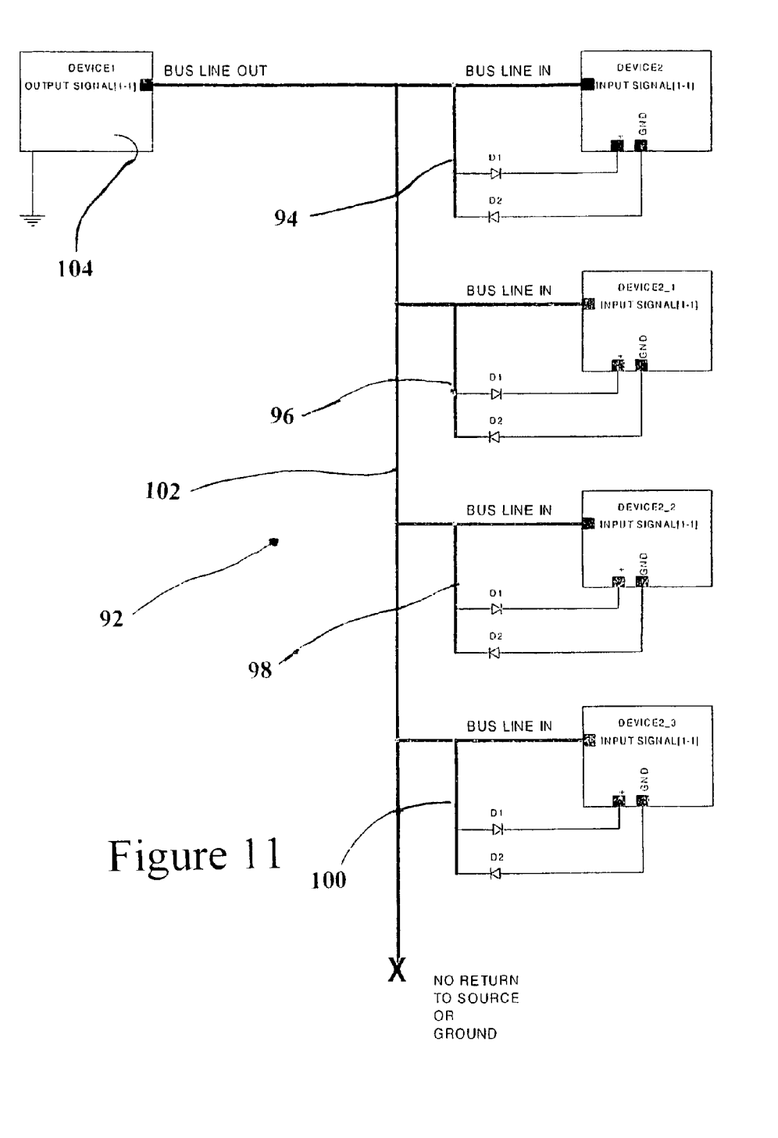
FIG. 11 shows a schematic view of a preferred embodiment of the invention.

Finally, FIG. 11 discloses a circuit 92 wherein directional circuits 94-100 are connected through a common bus conductor 102 to provide DC power and signals from generator 104 as described previously herein.

What is claimed is:

1. A circuit for receiving both power and data, the circuit comprising:
    a transmission conductor for receiving an alternating electromagnetic field having both an AC power and an AC data element;
    an output from the transmission conductor to a data signal receiver capable of receiving and utilizing data signals received by the transmission conductor, the data signal receiver having no separate return path to the transmission conductor and no physical conductive path to earth ground;
    a directional circuit connected to the transmission conductor, the directional circuit being a loop circuit which includes one or more circuit elements causing the loop circuit to be asymmetric to current flow, the directional circuit thereby developing a DC potential in response to the alternating electromagnetic field received via the transmission conductor, which potential is self referencing between a first DC potential output and a second DC potential output, the first DC potential output being relatively higher than the second DC potential output, the directional circuit having no separate DC return path to the transmission conductor and no physical conductive path to earth ground;
    one or more loads connected to the first and second DC potential outputs, and drawing at least direct current from the directional circuit as a result of the difference between the first and second DC potentials, the one or more loads also not having a separate DC return path to the transmission conductor nor a continuous DC conductive path to earth ground.

2. The circuit for receiving both power and data of claim 1 wherein the alternating electromagnetic field is wirelessly received by the transmission conductor.

3. The circuit for receiving both power and data of claim 2 wherein the transmission conductor is dynamically positional relative to a source of the wirelessly transmitted alternating electromagnetic field and is capable of receiving the wirelessly transmitted alternating electromagnetic field in a location remote from the source of the alternating electromagnetic field.

* * * * *